(No Model.) 6 Sheets—Sheet 3.
J. B. G. A. CANET.
TURRET AND TURRETED BARBETTE FOR GUNS.
No. 419,921. Patented Jan. 21, 1890.
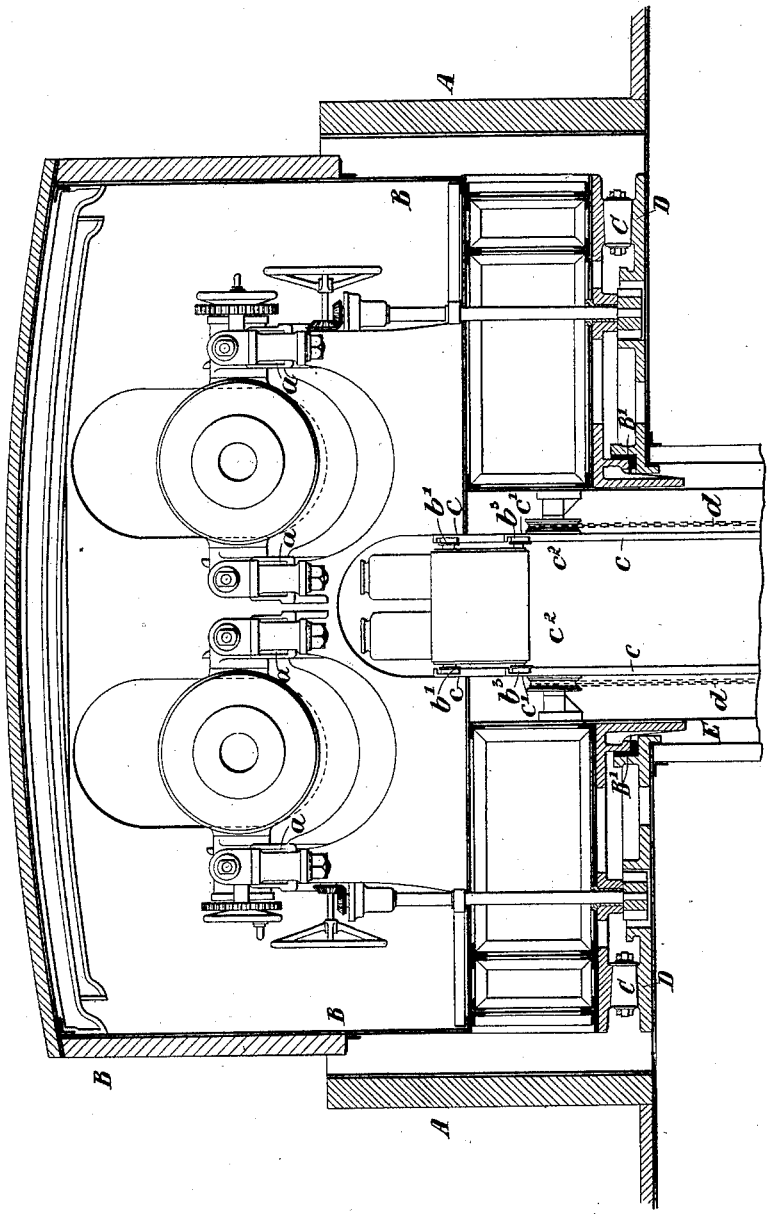

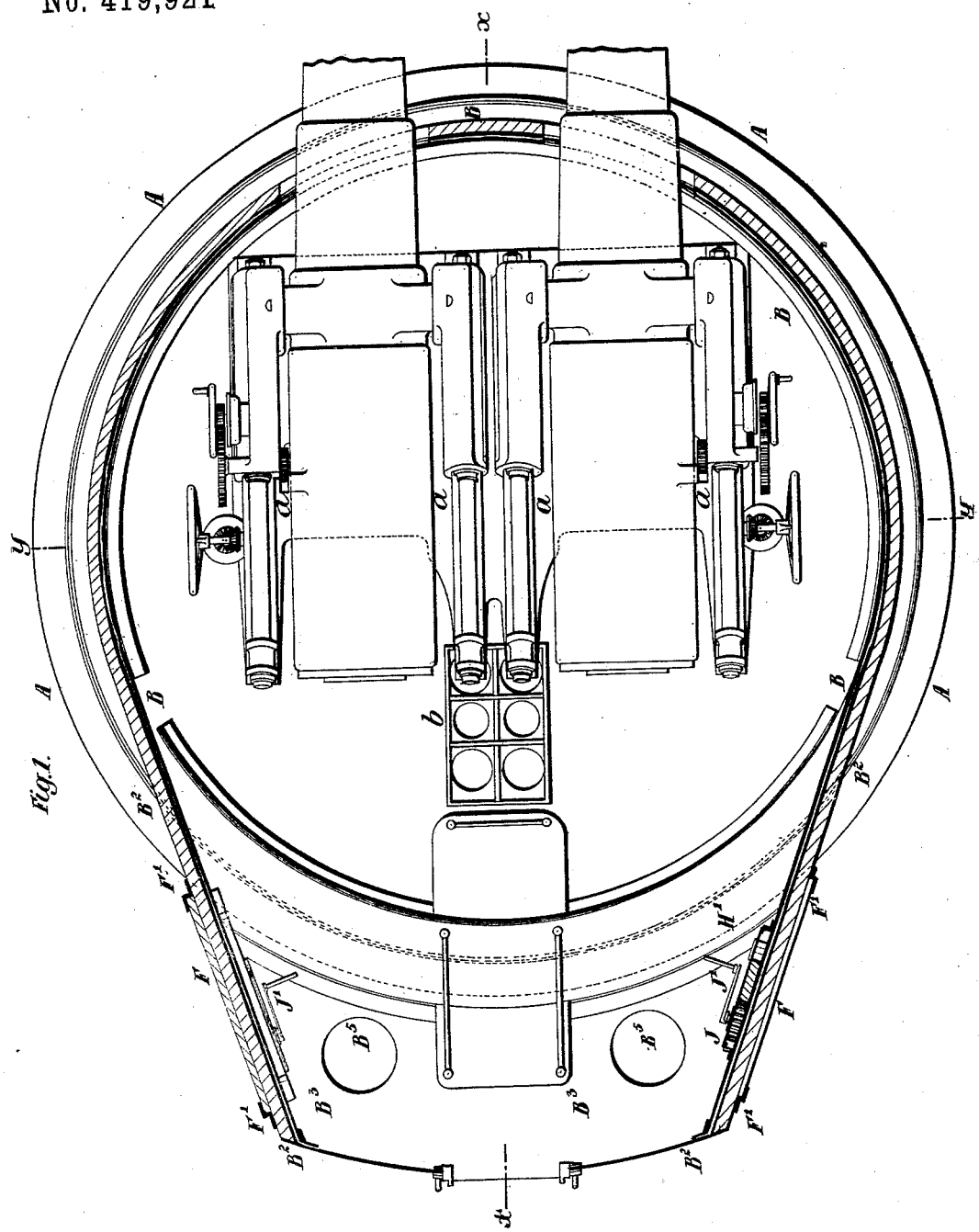

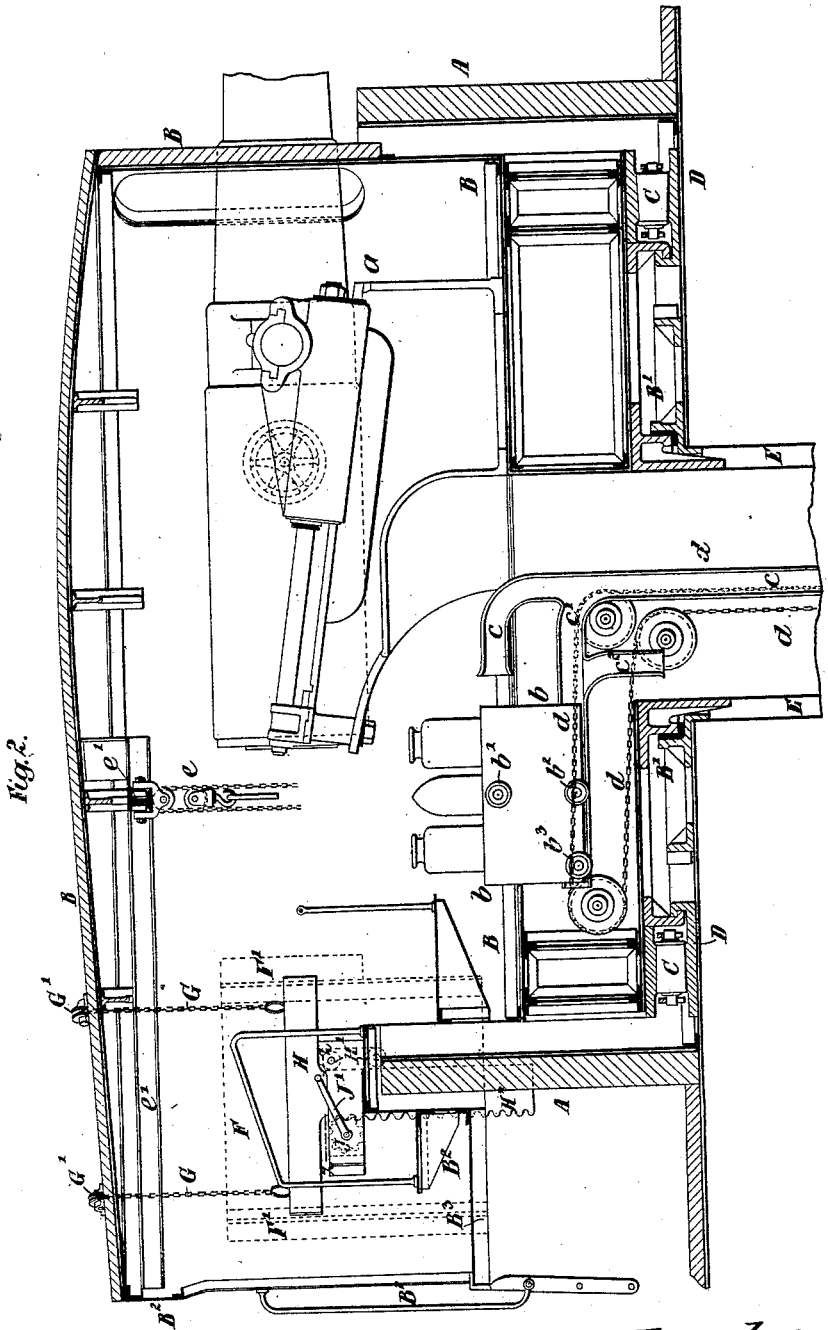

(No Model.) 6 Sheets—Sheet 4.
J. B. G. A. CANET.
TURRET AND TURRETED BARBETTE FOR GUNS.
No. 419,921. Patented Jan. 21, 1890.
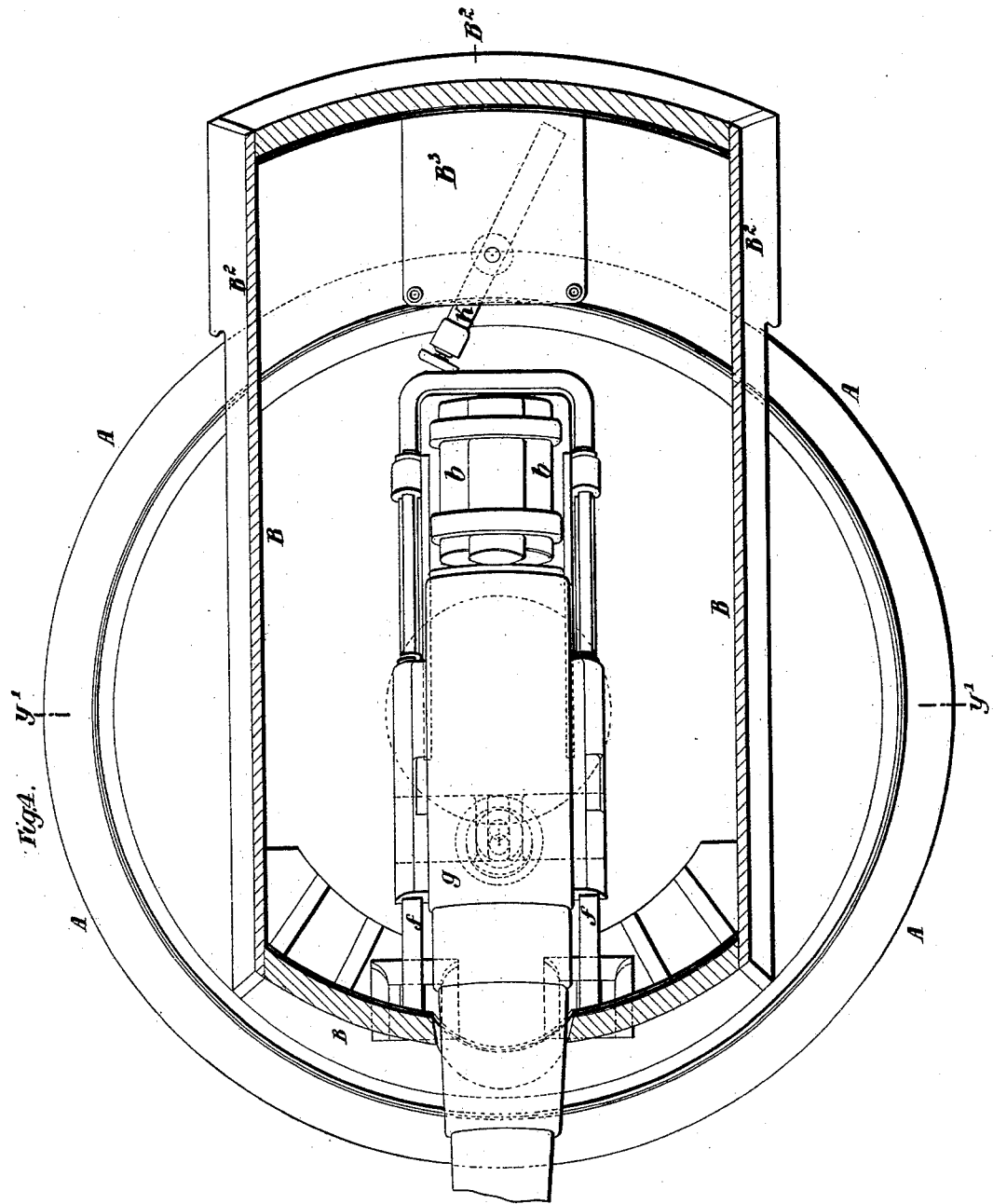

(No Model.) 6 Sheets—Sheet 5.
J. B. G. A. CANET.
TURRET AND TURRETED BARBETTE FOR GUNS.
No. 419,921. Patented Jan. 21, 1890.
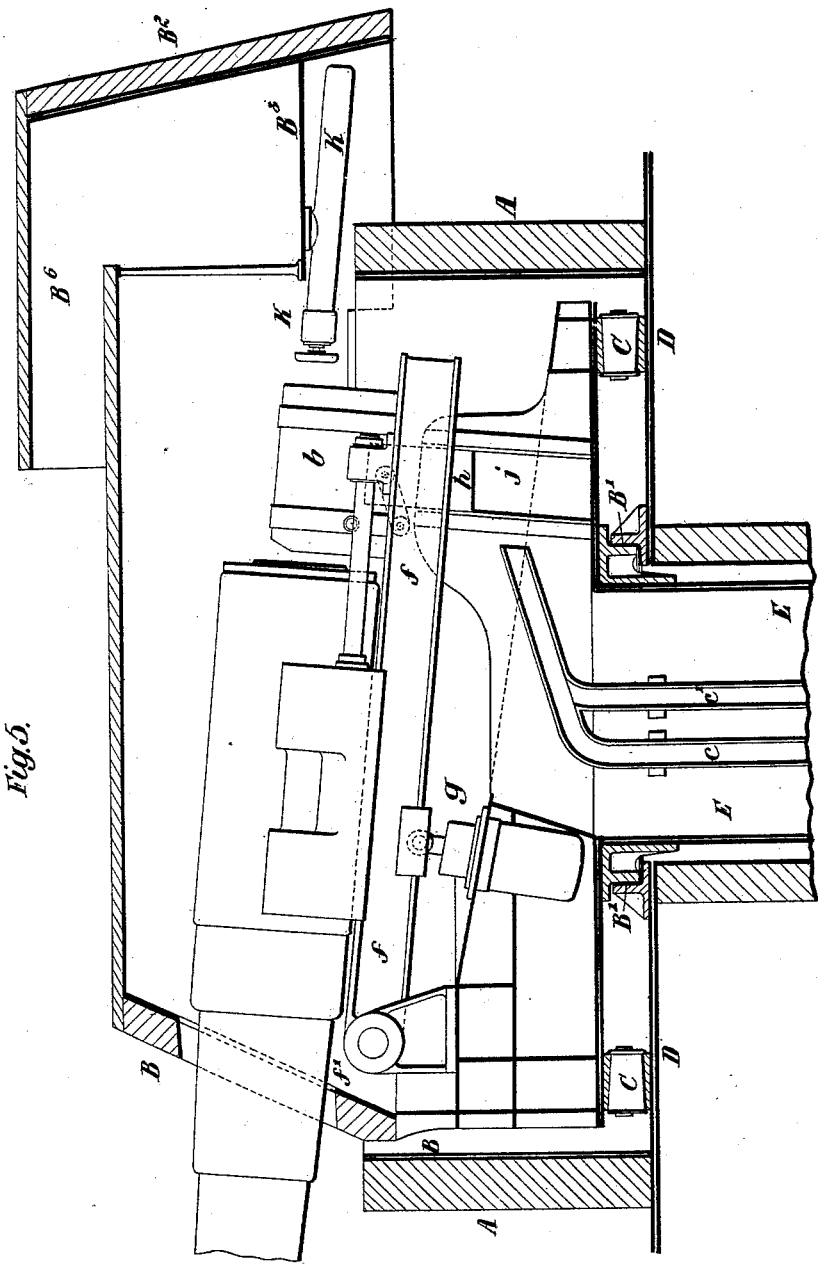

(No Model.) 6 Sheets—Sheet 6.
J. B. G. A. CANET.
TURRET AND TURRETED BARBETTE FOR GUNS.
No. 419,921. Patented Jan. 21, 1890.
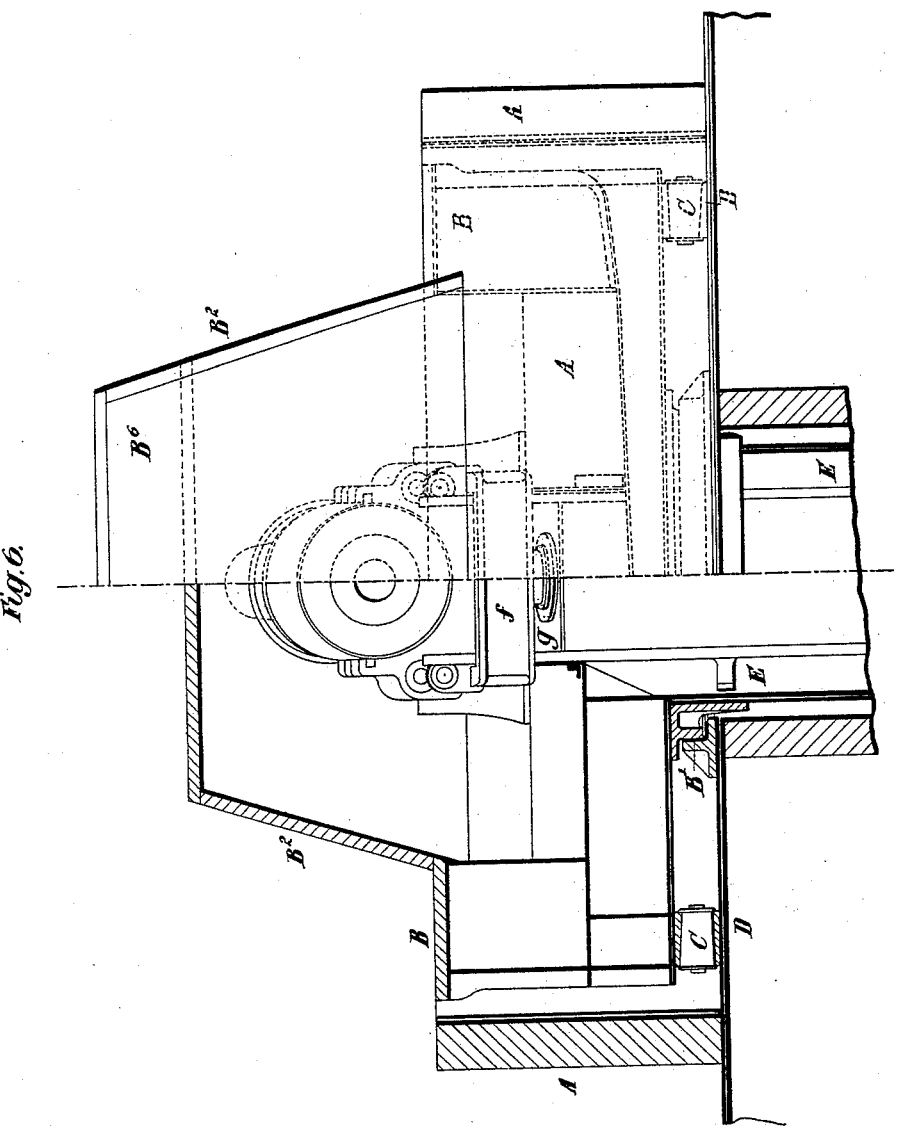
Witnesses
Inventor
Jean B. G. A. Canet
By James L. Norris
Atty.

UNITED STATES PATENT OFFICE.

JEAN BAPTISTE GUSTAVE ADOLPHE CANET, OF PARIS, FRANCE, ASSIGNOR OF ONE-HALF TO THE SIR JOSEPH WHITWORTH & COMPANY, (LIMITED,) OF MANCHESTER, ENGLAND.

TURRET AND TURRETED BARBETTE FOR GUNS.

SPECIFICATION forming part of Letters Patent No. 419,921, dated January 21, 1890.

Application filed January 10, 1889. Serial No. 295,966. (No model.) Patented in England November 29, 1887, No. 16,382.

*To all whom it may concern:*

Be it known that I, JEAN BAPTISTE GUSTAVE ADOLPHE CANET, civil engineer, a citizen of the Republic of France, and a resident of Paris, France, have invented new and useful Improvements in Turrets and Turreted Barbettes for Guns, (for which I have obtained a patent in Great Britain, No. 16,382, bearing date November 29, 1887,) of which the following is a specification, reference being had to the accompanying drawings.

This invention relates to structures having an armored or armor-plated turret or a turret or turn-table protected by an armored or armor-plated barbette, which turret or turn-table carries the gun or guns and the apparatus for working the same.

It has been the practice to arm ships of a certain class with guns mounted on center-pivot carriages carrying shields which, in combination with a superstructure of the ship, will afford protection to the gunners. Such ships and other classes of ships are generally constructed for carrying heavily-armored turrets or barbettes, but may be capable of carrying armor of moderate weight.

Now, the main object of this invention is to provide more efficient protection for the mounting and for the gunners than is practicable with the ordinary center-pivot carriage, while reducing the diameter of the turrets or barbettes, and thus diminishing the weight of armor above the water-line and still providing ample space for the gunners when working the gun or guns and for the recoil of the same.

Turrets and barbettes are usually so constructed that the gunners when firing stand within the circular area inclosed by the armor of the turret or barbette on a platform behind or at the side of the breech end of the gun, a sufficient space being left between the said platform and the gun to permit the convenient working of the gun and the recoil of the latter. The armored circular wall of the turret or barbette must therefore be of larger diameter than is actually necessary to inclose and protect the gun or guns and the apparatus or gearing for working the same.

Now, according to the present invention I construct the turret or turn-table of such a diameter or width as to conveniently carry the gun or guns and the apparatus connected therewith, and I extend the turret or turn-table at the rear of the said gun or guns to form a platform for accommodating the men working the same and for other purposes, the said platform being outside of the circumferential heavily-armored wall or part of the turret; or I provide a barbette-mounting with a lightly-armored turret or shield having at the rear of the gun or guns an extension forming a platform which projects beyond or overhangs the barbette, for the purpose above specified. The provision of the said platform as an extension or projection beyond or outside of the heavily-armored circumferential portion of the turn-table or turret or turreted barbette allows the diameter or width, and consequently the weight, of this portion of the structure for any given size or weight of gun to be smaller than has heretofore been practicable.

The overhanging platform can, if desired, be extended downward outside the barbette, care being taken that it shall not interfere with the rotation of the turn-table carrying the gun-mounting and turret. The said overhanging platform or chamber inclosing the same is in some cases protected by armor. This armor will, however, usually be much lighter than the armor of the barbette or of the main portion of the turret.

In some cases the superstructure of a ship consists of an upper deck with salient corners or angles at the sides. I prefer to arrange the mounting in such a position that the overhanging platform and the space beneath it are to some extent sheltered and protected by this superstructure.

My improved turret or turreted barbette is very advantageous for use with apparatus for central loading—that is to say, apparatus for elevating the ammunition through a central tube which rotates with the turret or turn-table, substantially as described in the specification accompanying another application for Letters Patent of the United States, filed by me on the 6th of March, 1889, Serial No. 302,062. It is, however, also advantageous in cases where other means are used for loading the gun.

In the accompanying drawings, Figure 1 is a plan, partly in horizontal section, showing my invention adapted to a turreted barbette-mounting for two guns. Fig. 2 is a vertical central section on the line $x\ x$, Fig. 1, some of the parts being shown in side elevation. Fig. 3 is a vertical central section on the line $y\ y$, Fig. 1, some of the parts being shown in rear elevation. Fig. 4 is a plan, partly in horizontal section, of a modification of my invention, and showing a turreted barbette-mounting for one gun. Fig. 5 is a vertical central section on the line $x'\ x'$, Fig. 4, some of the parts being shown in side elevation. Fig. 6 is a rear elevation, partly in vertical central section, on the line $y'\ y'$, Fig. 4.

Like letters indicate corresponding parts throughout the drawings.

A is the strongly or heavily armored circular barbette or wall for protecting the gearing.

B is the lightly-armored turret or shield or rotating part of the gun-mounting, which is supported through the medium of rollers C or balls upon a racer or roller path D. The said turret or shield B is provided with a center pivot B' and with a central tube E, through which the ammunition is to be elevated from a magazine or deck below the mounting, substantially as described in the said former specification.

$B^2$ is the chamber, which incloses or covers the overhanging or extended platform $B^3$ for accommodating the gunners.

In the apparatus shown in Figs. 1, 2, and 3 the chamber $B^2$ is extended over and downward outside the barbette or wall A, and the platform $B^3$ is below the top of the said wall or barbette. The turret B is, moreover, provided with an auxiliary platform $B^4$ within the wall or barbette A, to further facilitate the working of the guns. Each of the guns is mounted upon an inclined chassis or slide $a$ in combination with suitable recoil-brakes and elevating and training gear, and the guns are arranged to be turned about their trunnions for the vertical pointing or elevation. The charge-carrier for raising the powder and projectiles through the tube E, as shown in these figures, is a box $b$, provided on each side with rollers $b'\ b^2\ b^3$, arranged to move in guides $c\ c'\ c^2$, and to be operated by hydraulic or other apparatus through the medium of chains $d$, which pass around suitable wheels or pulleys, and are secured to the axles of the rollers $b^2$. The said carrier-box having its rollers arranged in combination with the guides will raise the projectiles and powder-charges in such a manner that they retain a vertical position throughout the movement of the carrier. An overhead traveling crane or crab $e$ is provided, whereby the projectiles and powder-charges may be lifted out of the carrier $b$ and moved into position behind the breech of either gun. This crab travels upon runner-ways $e'$, which extend in line with and transversely to the axes of the guns, and are provided with turn-tables for changing the direction of movement of the crab upon the said runner-ways. In some instances, because of the construction of the ship or for other reasons, the central charge-elevating apparatus is not used, and other means for supplying the gun with ammunition must be provided. Moreover, it is very desirable where the central apparatus is used that there should be auxiliary or alternative means for loading the guns in case of the destruction or disablement of the said central apparatus. For this purpose I sometimes make provision for passing the ammunition up through a hole or holes in the deck. In this case the platform $B^3$ is provided with one or more holes (shown at $B^5$, Fig. 1,) so arranged that by training or turning the platform they can be brought over the holes in the deck, so that the ammunition may be lifted through them by means of the crane or crab $e$. Armor-plates or shutters F are in some instances fitted to slide up and down between guides F' on the inside or outside of the chamber $B^2$. Each of these armor-plates or shutters is suspended by chains G, passing over pulleys G', to a T-shaped bar H, on the vertical portion of which is formed a rack $H^*$. The said bar is made of this form and of considerable thickness, so that without occupying an inconvenient amount of space it may serve to some extent for counterbalancing the heavy plate or shutter. With this rack is geared a pinion J, the axle of which has fixed thereon a crank or handle J'. By the manipulation of this handle the said armor-plate can be lowered into such a position that it will serve as a protection to the ammunition being passed through the space below the platform $B^3$, and when such protection is not required can be raised from this position, and will then afford additional protection to the sides of the platform-chamber.

Anti-friction rollers are arranged in contact with the edge of the rack $H^*$, as shown at H', and such rollers may also be provided for the shutters F. I prefer that the platform should be high enough above the deck to afford a clear space below the same, as shown; but if desired it may be close to the surface of the deck, the walls of the chamber being extended down so that the shutters F will be unnecessary.

In the apparatus shown in Figs. 4, 5, and 6 the extended or overhanging platform-chamber $B^2$ is constructed with a lookout $B^6$, and to the under side of the platform $B^3$ is pivoted a hydraulic rammer K, of any suitable construction. The gun shown in these figures is mounted upon a pivoted beam $f$, arranged to be turned about its pivot $f'$ by means of a hydraulic press $g$, to effect the vertical pointing or elevation of the gun. The charge-elevating apparatus comprises a rotating charge-carrier $b$, guides $cc'$, arranged to rotate with the mounting, and a grooved slide $h$, arranged to move up and down between guides $j$ on the said mounting, substantially as described in the said former specification.

It is obvious that my improvements are applicable to turrets and turreted barbette-mountings for use on land.

I have herein described special means for elevating the ammunition or raising the same from a magazine or deck into a convenient position for thrusting it into the bore of the gun; but I can, if desired, use other suitable means for raising the ammunition.

What I claim is—

1. A turreted or barbette gun-mounting having a rotative platform or turn-table for carrying a gun or guns within or behind its wall of strong or heavy armor and constructed with a gunner's platform extending outward from or beyond the said strong or heavy armor, for the purpose above specified.

2. A turreted or barbette gun-mounting having a rotative platform or turn-table for carrying the gun or guns within or behind its wall of strong or heavy armor and constructed with an exterior overhanging gunner's platform protected by armor-plates, substantially as and for the purposes set forth.

3. A turreted or barbette gun-mounting constructed with an exterior overhanging gunner's platform provided with a hole, through which the ammunition may be raised, substantially as and for the purposes set forth.

4. A turreted or barbette gun-mounting constructed with an exterior overhanging gunner's platform having a hole through which the ammunition may be raised, and armor-plates or shutters for protecting the space through which the ammunition is raised to the said platform, substantially as and for the purposes set forth.

5. A turreted or barbette gun-mounting constructed with an exterior overhanging gunner's platform having a hole through which the ammunition may be raised, armor-plates or shutters for protecting the space through which the ammunition is raised to the said platform, and means, substantially such as above described, for raising and lowering the said armor-plates or shutters, substantially as and for the purposes set forth.

6. The combination, with the heavily-armored wall of a turreted or barbette gun-mounting, of a rotative platform or turn-table arranged within the same and provided with an exterior overhanging gunner's platform, and with a lightly-armored chamber inclosing and protecting the said gunner's platform, substantially as and for the purposes set forth.

7. The combination, with a ship's superstructure or upper deck having salient corners or angles at the sides, of a turreted or barbette gun-mounting constructed with an exterior overhanging gunner's platform so arranged relatively to the said superstructure that the latter affords protection to the said platform and to the space beneath it, substantially as and for the purpose set forth.

8. The combination, with the heavily-armored wall of a turreted or barbette gun-mounting, of a rotative platform or turn-table arranged within the same and provided with an exterior overhanging gunner's platform and with a lightly-armored chamber inclosing and protecting the said gunner's platform, and constructed with a lookout, substantially as and for the purposes set forth.

9. The combination, with the heavily-armored wall of a turreted or barbette gun-mounting, of a rotative platform or turn-table arranged within the same and provided with an exterior overhanging gunner's platform, and a rammer pivoted to the said gunner's platform, substantially as and for the purposes set forth.

10. The combination of the heavily-armored wall A, the rotative platform or turn-table B, and the gunner's platform $B^3$, secured to and moving with the said turn-table and extending therefrom over the said armored wall, substantially as and for the purposes set forth.

11. The combination of the heavily-armored wall A, the rotative platform or turn-table B, arranged within the same, and the gunner's platform $B^3$, secured to and moving with the said turn-table and extending therefrom over the said armored wall and provided with holes $B^5$, through which the ammunition may be raised to the said platform, substantially as and for the purposes set forth.

12. The combination of the heavily-armored wall A, the rotative platform or turn-table B, arranged within the same, and the gunner's platform $B^3$, secured to and moving with the said turn-table and extending therefrom over the said armored wall, and provided with holes $B^5$, through which the ammunition may be raised to the said platform, the lightly-armored chamber $B^2$, inclosing and protecting the said gunner's platform, shutters F for protecting the space beneath the said gunner's platform, chains G, provided with weights H for counterbalancing the said shutters, and a rack $H^*$ and pinion J for raising and lowering the said shutters, substantially as and for the purposes set forth.

13. The combination, with the heavily-armored wall A and the rotative platform or turn-table B, of the gunner's platform $B^3$, secured to and moving with the said turn-table and extending therefrom over the said heavily-armored wall, the lightly-armored chamber $B^2$, inclosing and protecting the said gunner's platform, and the lookout $B^6$, connected with the said chamber, substantially as and for the purposes set forth.

14. The combination, with the heavily-armored wall A and the rotative platform or turn-table B, of the gunner's platform B³, secured to and moving with the said turn-table and extending over the said heavily-armored wall, and the hydraulic rammer K, pivoted to the under side of the said gunner's platform, substantially as and for the purposes set forth.

In testimony whereof I have hereunto signed my name in the presence of two subscribing witnesses.

JEAN BAPTISTE GUSTAVE ADOLPHE CANET.

Witnesses:
R. J. PRESTON,
J. L. RATHBONE.